March 19, 1929. W. N. DAVIS ET AL 1,705,809
PROCESS OF REMOVING SULPHUR COMPOUNDS FROM PETROLEUM OILS
Original Filed Oct. 15, 1924
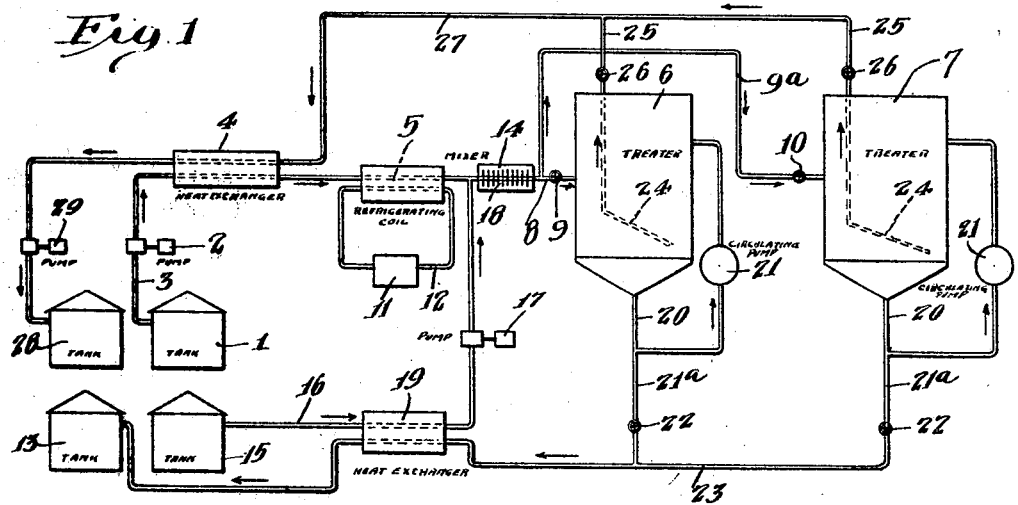
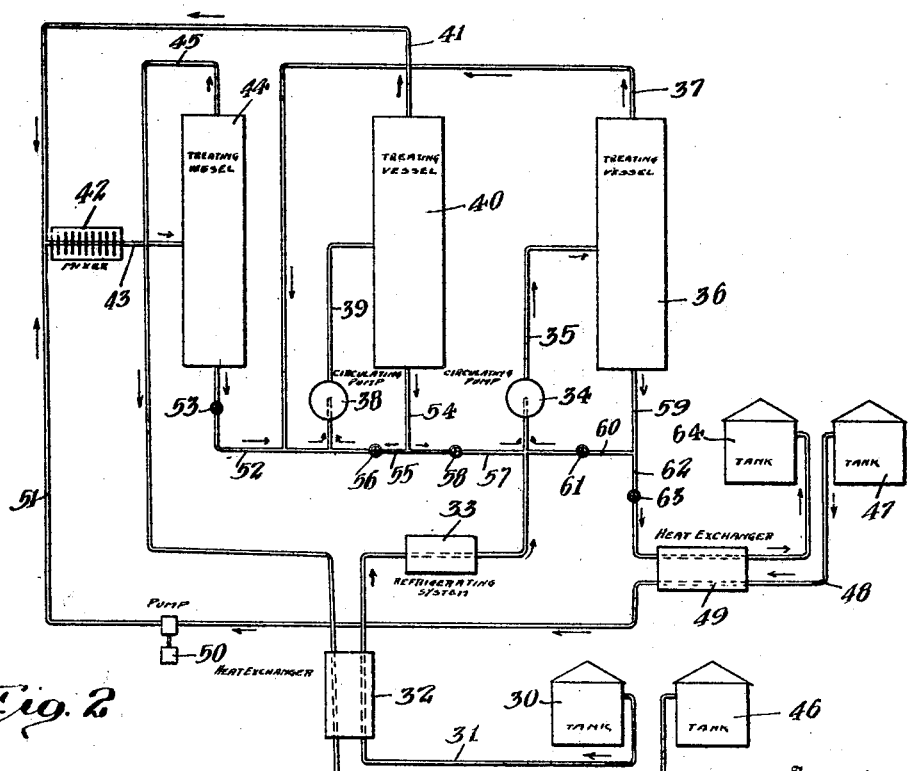

Patented Mar. 19, 1929.

1,705,809

UNITED STATES PATENT OFFICE.

WILLIAM N. DAVIS, OF OAKLAND, AND WILLIAM H. HAMPTON, OF BERKELEY, AND EDWIN N. KLEMGARD, OF ALBANY, CALIFORNIA, ASSIGNORS, BY MESNE ASSIGNMENTS, TO STANDARD OIL COMPANY OF CALIFORNIA, OF SAN FRANCISCO, CALIFORNIA, A CORPORATION OF DELAWARE.

PROCESS OF REMOVING SULPHUR COMPOUNDS FROM PETROLEUM OILS.

Application filed October 15, 1924, Serial No. 743,681. Renewed June 2, 1928.

This invention relates to a process of removing sulphur bodies from petroleum oils and refers particularly to a process of treating petroleum oils for preparation of gasoline or motor fuel.

The greater portion of those petroleum oils that are now used in cracking processes for obtaining naphtha or motor fuels are high in sulphur content. The resulting naphtha or motor fuel prepared from such oils is as a consequence also high in sulphur bodies and much difficulty has been encountered in developing a method for treating this product to remove the sulphur bodies.

The method that has been most generally employed for this purpose is to treat the naphtha or gasoline with sulphuric acid at ordinary or room temperatures. The sulphuric acid employed has been 66° Bé. acid and while by such methods it is possible to obtain a motor fuel with a considerably reduced sulphur content by a steam distillation of the treated naphtha, such a process involves a large loss of the hydrocarbons having boiling points within the gasoline range. This loss of the desired boiling point gasoline is due to the polymerizing action of the sulphuric acid on the unsaturated bodies which polymerize to form hydrocarbons of higher molecular weight and boiling point and thus are removed from boiling point range of gasoline. The removal of the sulphur bodies by this customary treatment is also due to the polymerization of the sulphur bodies to higher boiling point oil soluble constituents which therefor do not pass over upon steam distillation of the treated oil. It is therefore apparent that the present method of removing sulphur bodies by treatment with sulphuric acid at ordinary temperatures involves a polymerization of the sulphur bodies which goes hand in hand with the polymerization of unsaturated hydrocarbons of the oil which are desirable in the finished gasoline and consequently the present treatment involves an undesirable loss.

An object of the present invention is to provide a process of removing the sulphur bodies in such naphtha or motor fuel which can be carried out without any accompanying polymerization of such unsaturated hydrocarbons as are desirable in the finished gasoline.

By the process of the present invention the sulphur bodies in such naphtha or motor fuels are removed by means of an agent acting as a solvent capable of dissolving the sulphur bodies without acting upon the unsaturated hydrocarbons desired in the finished gasoline. We have discovered that certain materials, such as sulphuric acid, when intermixed with naphtha, motor fuels or in fact most petroleum oils at low temperatures, act to remove the sulphur bodies from the same by taking such bodies into solution or forming a loose chemical combination with the same, in place of the polymerizing action involved in the present process of removing such sulphur bodies, so that upon separation of the acid from the oil the sulphur bodies are removed without any substantial removal of unsaturated hydrocarbons which are desired in the gasoline. We have also discovered that the removal of sulphur bodies by a solvent action at low temepratures is most effectively accomplished by strong sulphuric acid such, for example, as sulphuric acid greater than 97% in strength and that particularly fuming sulphuric acids, such as about 15% fuming acid, gives the best results in the solvent removal of sulphur bodies. While ordinarily the solubility of one material in another increases with temperature, the action here discovered acts in the opposite manner, the increase in solubility undoubtedly being due to the formation of certain loose chemical compounds between the sulphur bodies and acid, which are stable at low temperatures but either do not form or decompose at higher temperatures, such as room temperature, or above.

Other objects and advantages of the present invention will be apparent from a description of the preferred process or processes embodying the invention. Such processes will be more readily understood from the following description of the accompanying drawings, in which there is diagrammatically indicated apparatus suitable for carrying out such processes.

In the drawings:

Fig. 1 is a diagrammatical view of an apparatus suitable for the treatment of oils to remove sulphur bodies at reduced temperatures by a batch method.

Fig. 2 is a diagrammatical view of an apparatus for treatment of oils to remove sulphur bodies at reduced temperatures by the use of a continuous counterflow method of treatment.

Referring first to Fig. 1, 1 indicates a storage vessel for the naphtha, motor fuel or other petroleum oil which is to be treated. 2 indicates a pump designed to draw the naphtha from the vessel 1 through the line 3 and force the same through a heat exchanger 4 and refrigerating coil 5 through a mixing device 14 into treaters 6 and 7 and the line 3 being connected through a line 8 controlled by a valve 9 to the vessel 6 and connected also by a line 9ª controlled by a valve 10 to the vessel 7 so that the naphtha to be treated may be forced by the pump 2 selectively into either treater 6 or 7. The refrigerating coil 5 may be cooled by any of the generally known methods of refrigeration, such as a compression machine including a compressor 11 adapted to compress such substance as ammonia, sulphur dioxide, carbon dioxide, or the like, and thus liquefy the same by passing the same through the coil 12 cooled by any suitable means, and then permitted to expand in the neighborhood of the refrigerating coil 5 in order to reduce the temperature of crude naphtha passing therethrough.

15 indicates a storage vessel for the treating agent which is connected by a line 16 to a pump 17 adapted to draw the treating agent from the vessel 15 and force the same into the mixing device 14 where the treating agent passes, together with the crude naphtha, into either the treater 6 or the treater 7. The mixing device 14 is indicated as a vessel provided with suitable baffles 18 for securing contact between the crude naphtha and treating agent prior to their introduction into the treater 6 or 7. The line 16 leading from the storage vessel 15 is indicated as preferably passing through a sludge heat exchanger 19. Each of the treaters 6 and 7 is provided with a line 20 connected at their lower ends, which lines 20 lead to sludge circulating pumps 21 discharging again into the treaters near the top of the treaters, so that the mixture in the treaters 6 and 7 may be circulated through the lines 20 by pump 21 out and back into the vessel to thoroughly agitate the naphtha with the treating agent. The lines 20 also connect with lines 21ª controlled by valves 22 through which sludge separated in the treaters may be drawn off and passed through a line 23 leading through sludge heat exchanger 19 to storage tank 13.

Each of the treaters 6 and 7 is also provided with a swing pipe 24 by which the treated naphtha may be drawn off and passed through lines 25 controlled by valves 26 into a line 27 passing through the naphtha heat exchanger 4 into a treated naphtha tank 28, the line 27 being provided with a suitable pump 29.

With such an apparatus the process is preferably conducted as follows: The fresh or crude naphtha in the vessel 1 is pumped through line 3 through the naphtha heat exchanger 4 and refrigerating coil 5 into the mixer 14 and hence to one of the treaters 6 or 7. During such time the treated naphtha from the other treater 6 or 7 is simultaneously withdrawn through the line 27 and passed through the naphtha heat exchanger 4 in order that the crude naphtha to be treated may be partially cooled from the treated naphtha passing through the storage vessel 28. In the refrigerating coil 5 the temperature of the crude naphtha is reduced. The temperature found most favorable for the cold treatment is between 15 and 20° F. although it is not intended to limit the temperature of the treatment to within such range, the best temperature of treatment may vary with changes of other conditions of the process. When, as preferred, the treating agent is 15% fuming sulphuric acid, this acid freezes at 14° F. and hence the best treatment, as previously stated, is between 15 and 20° F. The higher temperature employed, the greater will be the undesired polymerization of the unsaturated constituents of the crude naphtha and hence the treating loss be increased. In the before-described apparatus, it is preferable to cool the crude naphtha to around 10° F. in the coil 5 as the treating agent will raise slightly the temperature of the mixture before it passes into the treaters. Simultaneously with the passing of the crude naphtha into the treaters, the treating agent is drawn by pump 17 so as to flow through treating device 14 together with the crude naphtha. There is also drawn the spent treating agent from the previous treatment through the line 23 and heat exchanger 19 in order to cool the fresh treating agent passing to the mixing device 14.

As previously pointed out, the preferred treating agent is concentrated sulphuric acid such as 15% fuming acid, although it is not desired to limit the invention to such treating agent but to include generally such equivalent agents as are capable of removing sulphur bodies from the naphtha by solvent action at reduced temperatures. In the treater 6 or 7 the charge so introduced will be circulated by action of the pump 21 to secure thorough contact between the treating agent and naphtha. In certain cases it may be desirable to employ cooling coils in the treaters 6 and 7 to prevent the temperature rising above 20° F.

Now referring to the apparatus shown in

Fig. 2, 30 indicates a storage vessel for the crude naphtha to be treated. 31 indicates a line leading from the storage vessel 30 first through a naphtha heat exchanger 32 and hence through a refrigerating system 33 to a pump 34 adapted to draw the crude naphtha from the tank 30 and pass the same through a line 35 into a treating vessel 36 the line 35 preferably communicating with the treating vessel 36 near the center of the vessel. From the top of the vessel 36 leads a line 37 which connects with a pump 38 adapted to draw naphtha from the treating vessel 36 and pass the same through a line 39 connecting with a treating vessel 40 near its center. 41 indicates a line leading from the top of the treating vessel 40 and connected with a mixing device 42 in turn connected by line 43 with the center of a treating vessel 44. 45 indicates a line leading from the upper end of the treating vessel 44 through the naphtha heat exchanger 32 to a storage vessel 46 for the treated naphtha.

47 indicates a storage vessel for the acid or other solvent treating agent to be employed, the vessel 47 being connected by a line 48 through a sludge heat exchanger 49 to a pump 50, the outlet end of which is connected by a line 51 to the mixing device 42 in order that the treating agent may pass together with the material from line 41 through the mixing device and first into the center of the treating vessel 44. The bottom of the treating vessel 44 is connected by a line 52 controlled by the valve 53 with the inlet end of the pump 38. The bottom of the treater 40 is connected by a line 54 with both a line 55 controlled by a valve 56 and connected to the inlet end of the pump 38 and to a line 57 controlled by a valve 58 to the inlet end of the pump 34. The treating vessel 36 is connected at its lower end by a line 59 connected both by a line 60 controlled by a valve 61 with the inlet end of the pump 34 and by a line 62 controlled by a valve 63 with the sludge heat exchanger 49 from which the line leads to a spent treating agent storage vessel 64.

The process as carried out in the continuous apparatus is as follows: The crude naphtha is continuously passed from the storage vessel 30 through the heat exchanger 32 and refrigerating coil 33 into the treating vessel 36 entering near the center. Above the point at which the line 35 enters the vessel the crude naphtha will settle from the sludge supplied thereto and is continuously drawn off through the line 37 and passed through pump 38 into the center of treating vessel 40. Likewise the naphtha is then drawn from the top of the vessel 40 and passed through the line 41 through the mixing device 42 into the center of the treating vessel 44. From the top of the treating vessel 44 the naphtha is withdrawn through the line 45 and passes through the heat exchanger 32 to the storage vessel 46. The treating agent passes through the sludge heat exchanger 49 into the mixing device 42 where it is mixed with the naphtha passing through line 43 to the vessel 44. It will thus be seen that the fresh agent comes in contact with the most treated naphtha.

In the vessel 44 the acid settles to the bottom where it is drawn off through line 52 and passes, together with the naphtha in line 37 into the inlet end of the pump 38 from which the mixed naphtha and treating agent pass into the center of the treater 40. In the treater 40 the treating agent settles to the bottom of the vessel where it is drawn off through the line 54. Preferably part of this agent is passed through line 55 into inlet end of pump 38 in order that part of the agent may be recirculated through the vessel 40. The remainder of the acid passes through a line 57 through the pump 34 entering together with the fresh naphtha into the center of the treating vessel 36. It is thus apparent that the fresh naphtha of the system is brought into contact with the nearly spent agent. The agent settling to the bottom of the treating vessel 36 is continuously drawn off through the line 59 from which part of the agent is recirculated through line 60 and pump 34 back into the vessel 36 and the remainder is drawn through line 62 through the sludge heat exchanger 49 into the storage vessel 64.

The temperature to which the naphtha agent mixture is reduced is preferably the same as in the previous described process.

By the processes of this invention crude naphtha may be treated for the removal of sulphur bodies with the minimum polymerization of the unsaturated bodies desired in the finished naphtha and thus the treating loss substantially reduced. While the treatment is particularly useful upon naphtha obtained from a cracking process it is not intended to limit the invention to the treatment of such naphtha as it may also be applicable for treating oils such as shale oil, etc., which are high in sulphur content and contain a large percentage of unsaturated bodies.

The process is of a particular value in the treatment of cracked distillates. To effect efficiently the removal of sulphur bodies from such distillates, it is necessary that the sulphur bodies be dissolved therefrom at a temperature below 38° F. and preferably below 20° F. as cracked distillates normally contain an excessive quantity of unsaturated constituents which will be readily attacked by the acid, unless these low temperatures are employed, with the result that the unsaturated material would be polymerized and removed from the finished product and thus the saving of these bodies not effected.

It is understood, of course, that the sulphuric acid employed must be one which does not freeze at the temperature employed. It is necessary thus in the process, where employing the fuming sulphuric acids, that the acids should contain from 5 to 25% of sulphuric anhydrid where the process is carried out below 38° F., or where it is to be employed upon cracked distillates. Unless set within this range fuming sulphuric acids have such high melting points as to be inoperative. This is better understood from the following table of melting points of sulphuric acid.

| $H_2SO_4$ % | Melting point °C. |
|---|---|
| 100.00 | 10.0 |
| 4% fuming | 2.0 |
| 10% fuming | −10.0 |
| 15% fuming | −11.0 |
| 20% fuming | −10.0 |
| 40% fuming | 33.0 |
| 50% fuming | 30.0 |
| 60% fuming | 0.8 |

While the processes herein described are well adapted to accomplish the purposes of this invention, various modifications may be made without departing from the spirit of the invention. The invention is of the scope set forth in the appended claims.

We claim:

1. The process of treating petroleum oils which comprises cooling the oils below 20° F. and contacting the oils with fuming sulphuric acid.

2. The process of treating petroleum oils for the removal of sulphur bodies substantially without polymerizing the unsaturated constituents of the oils which includes substantially cooling the oils and contacting the same at a temperature below 20° F. with fuming sulphuric acid containing between 5 and 25% sulphuric anhydrid.

3. In a process of treating cracked petroleum naphtha and similar high sulphur petroleum distillates with sulphuric acid to remove sulphur bodies, substantially reducing the polymerization of unsulphured bodies by treating the oil at below 38° F. with an acid of lower freezing point than the reaction temperature.

4. In a process of treating cracked petroleum naphtha and similar high sulphur petroleum distillates with sulphuric acid to remove sulphur bodies, substantially reducing the polymerization of unsulphured bodies by cooling the oil to below 38° F. and treating the cool oil with an acid of lower freezing point than the reaction temperature.

5. In a process of treating cracked petroleum naphtha and similar high sulphur petroleum distillates with sulphuric acid to remove sulphur bodies, substantially reducing the polymerization of unsulphured bodies by continuously cooling the oil to below 38° F., continuously passing the cool oil countercurrent to an acid of lower freezing point than the reaction temperature to mix therewith, and continuously separating the treated oil from the spent acid.

Signed at Richmond, California, this 6th day of October, 1924.

WILLIAM N. DAVIS.
WILLIAM H. HAMPTON.
EDWIN N. KLEMGARD.